US009511674B2

(12) United States Patent
Keeling et al.

(10) Patent No.: US 9,511,674 B2
(45) Date of Patent: Dec. 6, 2016

(54) BASE DISTRIBUTION NETWORK FOR DYNAMIC WIRELESS CHARGING

(71) Applicant: QUALCOMM Incorporated, San Diego, CA (US)

(72) Inventors: Nicholas Athol Keeling, Auckland (NZ); Chang-Yu Huang, Auckland (NZ); Michael Le Gallais Kissin, Auckland (NZ); Jonathan Beaver, Auckland (NZ); Mickel Bipin Budhia, Auckland (NZ); Claudio Armando Camasca Ramirez, Auckland (NZ)

(73) Assignee: QUALCOMM Incorporated, San Diego, CA (US)

( * ) Notice: Subject to any disclaimer, the term of this patent is extended or adjusted under 35 U.S.C. 154(b) by 164 days.

(21) Appl. No.: 14/308,002

(22) Filed: Jun. 18, 2014

(65) Prior Publication Data

US 2015/0298559 A1 Oct. 22, 2015

Related U.S. Application Data

(60) Provisional application No. 61/981,579, filed on Apr. 18, 2014.

(51) Int. Cl.
*H02J 7/00* (2006.01)
*B60L 11/18* (2006.01)
(Continued)

(52) U.S. Cl.
CPC .............. *B60L 11/182* (2013.01); *B60L 5/005* (2013.01); *B60L 11/14* (2013.01); *B60L 11/1831* (2013.01);
(Continued)

(58) Field of Classification Search
CPC ............ H02J 7/025; H02J 5/005; H02J 7/007; H02J 7/04; H02J 7/0021; H02J 7/0029; H02J 2007/0037; H02J 2007/0039; H02J 2007/004; H02J 7/0054; H04B 5/0081; B60L 11/1861; H01F 38/14
(Continued)

(56) References Cited

U.S. PATENT DOCUMENTS 5,207,304 A  5/1993 Lechner et al.
2005/0178632 A1  8/2005 Ross
(Continued)

FOREIGN PATENT DOCUMENTS

EP  0289868 A2  11/1988
EP  2541730 A1  1/2013
(Continued)

OTHER PUBLICATIONS

International Search Report and Written Opinion—PCT/US2015/023840—ISA/EPO—Nov. 3, 2015.

*Primary Examiner* — Nghia Doan
(74) *Attorney, Agent, or Firm* — Knobbe Martens Olson & Bear LLP

(57) ABSTRACT

Dynamic systems may require a large number of coils (charging pads) which may be installed into the roadway to wirelessly provide power to electric vehicles as they are traveling along the roadway. The current in each of these coils may need to be turned on and off as a vehicle drives over the coils in order to efficiently utilize power and properly convey power to the passing vehicles. The supply network behind these coils may need to be capable of managing the individual coils with minimal infrastructure and cost as well as be capable of distributing the required power from the power grid to these pads efficiently and safely. The supply network may include charging coils, switches, local controllers, and distribution circuitry within
(Continued)

a modular element, which may receive power from external sources and may be controlled by a central controller.

30 Claims, 6 Drawing Sheets

(51) Int. Cl.
  *H02J 5/00* (2016.01)
  *H02J 7/02* (2016.01)
  *B60L 5/00* (2006.01)
  *B60M 1/36* (2006.01)
  *B60M 7/00* (2006.01)
  *B60L 11/14* (2006.01)

(52) U.S. Cl.
  CPC ............ *B60L 11/1846* (2013.01); *B60M 1/36* (2013.01); *B60M 7/003* (2013.01); *H02J 5/005* (2013.01); *H02J 7/007* (2013.01); *H02J 7/0052* (2013.01); *H02J 7/025* (2013.01); *B60L 2200/12* (2013.01); *B60L 2210/30* (2013.01); *B60L 2240/12* (2013.01); *Y02T 10/70* (2013.01); *Y02T 10/7005* (2013.01); *Y02T 10/7072* (2013.01); *Y02T 10/7077* (2013.01); *Y02T 10/7241* (2013.01); *Y02T 90/121* (2013.01); *Y02T 90/122* (2013.01); *Y02T 90/125* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
  USPC .......................................................... 320/108
  See application file for complete search history.

(56) References Cited

U.S. PATENT DOCUMENTS

| | | | |
|---|---|---|---|
| 2009/0096413 A1* | 4/2009 | Partovi | ................... H01F 5/003 320/108 |
| 2010/0259217 A1* | 10/2010 | Baarman | ................ H02J 5/005 320/108 |
| 2012/0161530 A1 | 6/2012 | Urano | |
| 2012/0161535 A1 | 6/2012 | Jung et al. | |
| 2012/0256585 A1* | 10/2012 | Partovi | ................... H01F 5/003 320/108 |

FOREIGN PATENT DOCUMENTS

| | | |
|---|---|---|
| GB | 2521676 A | 7/2015 |
| WO | WO-2008051611 A2 | 5/2008 |
| WO | WO-2011046400 A2 | 4/2011 |
| WO | WO-2013091875 A2 | 6/2013 |
| WO | WO-2014035260 A1 | 3/2014 |

* cited by examiner

BASE DISTRIBUTION NETWORK FOR DYNAMIC WIRELESS CHARGING

CLAIM OF PRIORITY UNDER 35 U.S.C. §119

The present Application for Patent claims priority to Provisional Application No. 61/981,579 entitled "BASE DISTRIBUTION NETWORK FOR DYNAMIC WIRELESS CHARGING" filed Apr. 18, 2014, and assigned to the assignee hereof. Provisional Application No. 61/981,579 is hereby expressly incorporated by reference herein.

TECHNICAL FIELD

This application is generally related to wireless power charging of chargeable devices such as electric vehicles.

BACKGROUND

Chargeable systems, such as vehicles, have been introduced that include locomotion power derived from electricity received from an energy storage device such as a battery. For example, hybrid electric vehicles include on-board chargers that use power from vehicle braking and traditional motors to charge the vehicles. Vehicles that are solely electric generally receive the electricity for charging the batteries from other sources. Battery electric vehicles are often proposed to be charged through some type of wired alternating current (AC) such as household or commercial AC supply sources. The wired charging connections require cables or other similar connectors that are physically connected to a power supply. Cables and similar connectors may sometimes be inconvenient or cumbersome and have other drawbacks. It is desirable to provide wireless charging systems that are capable of transferring power in free space (e.g., via a wireless field) to be used to charge the electric vehicle to overcome some of the deficiencies of wired charging solutions. Additionally, wireless charging system should be capable of coordinating multiple base pads to properly coordinate the transfer of power continuously to a moving receiver over an extended distance of travel in a practical manner.

SUMMARY OF THE INVENTION

The embodiments disclosed herein each have several innovative aspects, no single one of which is solely responsible for the desirable attributes of the invention. Without limiting the scope, as expressed by the claims that follow, the more prominent features will be briefly disclosed here. After considering this discussion, one will understand how the features of the various embodiments provide several advantages over current dynamic wireless charging systems.

One embodiment of this invention comprises a device for distributing power, the device comprising a first set of charging coils configured to provide wireless power, a first set of switches configured to selectively control power to the first set of charging coils, a second set of charging coils configured to provide wireless power, a second set of switches configured to selectively control power to the second set of charging coils, and a control unit configured to control the first and second sets of switches. The first and second sets of charging coils may be interleaved, and the first set of switches may be configured to respectively couple one charging coil of the first set of charging coils to the control unit, and the second set of switches may be configured to respectively couple one charging coil of the second set of charging coils to the control unit.

In another embodiment, the invention may comprise a method for distributing power, the method comprising selectively coupling one charging coil of a first set of charging coils, the charging coils configured to provide wireless power, to a control unit via a first set of switches. The method further comprises selectively coupling one charging coil of a second set of charging coils, the charging coils configured to provide wireless power, to the control unit via a second set of switches. The method further comprising generating, via the one charging coil of the first set of charging coils and the one charging coil of the second set of charging coils, wireless fields to distribute power. The first and second sets of charging coils are interleaved.

An alternate embodiment may comprise a device for distributing power, the device comprising a first set of means for providing wireless power, a second set of means for providing wireless power, a first set of means for selectively controlling configured to selectively provide power to the first set of wireless power providing means, a second set of means for selectively controlling configured to selectively provide power to the second set of wireless power providing means, and means for controlling the first set of selectively controlling means and the second set of selectively controlling means. The first and second sets of wireless power providing means are interleaved. Each of the first set of selectively controlling means is further configured to respectively couple one of the first set of wireless power providing means to the controlling means, and each of the second set of selectively controlling means is further configured to respectively couple one of the second set of wireless power providing means to the controlling means.

BRIEF DESCRIPTION OF THE DRAWINGS

The above-mentioned aspects, as well as other features, aspects, and advantages of the present technology will now be described in connection with various embodiments, with reference to the accompanying drawings. The illustrated embodiments, however, are merely examples and are not intended to be limiting. Throughout the drawings, similar symbols typically identify similar components, unless context dictates otherwise. Note that the relative dimensions of the following figures may not be drawn to scale.

DETAILED DESCRIPTION OF THE PREFERRED EMBODIMENT

Figure 1:
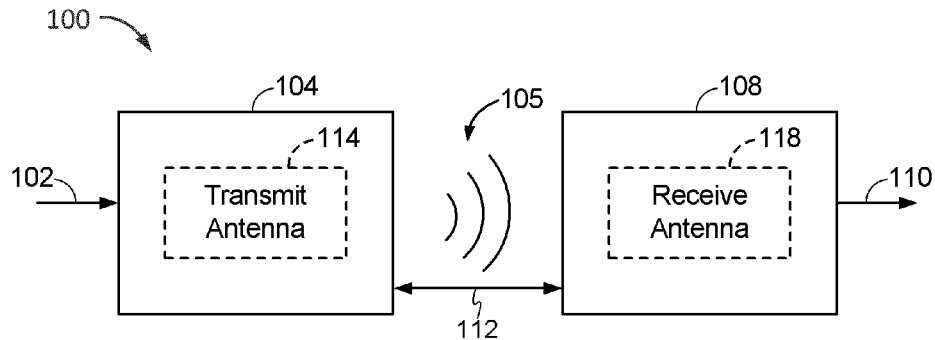
FIG. 1 is a functional block diagram of a wireless power transfer system, in accordance with one example of an implementation.

In the following detailed description, reference is made to the accompanying drawings, which form a part of the present disclosure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and form part of this disclosure.

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured by, or coupled by a "receive antenna" to achieve power transfer.

An electric vehicle is used herein to describe a remote system, an example of which is a vehicle that includes, as part of its motion capabilities, electrical power derived from a chargeable energy storage device (e.g., one or more rechargeable electrochemical cells or other type of battery). As non-limiting examples, some electric vehicle may be hybrid electric vehicles that include besides electric motors, a traditional combustion engine for direct locomotion or to charge the vehicle's battery. Other electric vehicles may draw all locomotion ability from electrical power. The electric vehicle is not limited to an automobile and may include motorcycles, carts, scooters, and the like. By way of example and not limitation, a remote system is described herein in the form of the electric vehicle (EV). Furthermore, other remote systems that may be at least partially powered using a chargeable energy storage device are also contemplated (e.g., electronic devices such as personal computing devices and the like).

The terminology used herein is for the purpose of describing particular embodiments only and is not intended to be limiting of the disclosure. It will be understood by those within the art that if a specific number of a claim element is intended, such intent will be explicitly recited in the claim, and in the absence of such recitation, no such intent is present. For example, as used herein, the singular forms "a", "an" and "the" are intended to include the plural forms as well, unless the context clearly indicates otherwise. As used herein, the term "and/or" includes any and all combinations of one or more of the associated listed items. It will be further understood that the terms "comprises," "comprising," "includes," and "including," when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list.

FIG. 1 is a functional block diagram of a wireless power transfer system 100, in accordance with one example implementation. An input power 102 may be provided to a transmitter 104 from a power source (not shown in this figure) to generate a wireless (e.g., magnetic or electromagnetic) field 105 for performing energy transfer. A receiver 108 may couple to the wireless field 105 and generate an output power 110 for storing or consumption by a device (not shown in this figure) coupled to the output power 110. Both the transmitter 104 and the receiver 108 are separated by a distance 112.

In one example implementation, the transmitter 104 and the receiver 108 are configured according to a mutual resonant relationship. When the resonant frequency of the receiver 108 and the resonant frequency of the transmitter 104 are substantially the same or very close, transmission losses between the transmitter 104 and the receiver 108 are minimal. As such, wireless power transfer may be provided over a larger distance in contrast to purely inductive solutions that may require large antenna coils which are very close (e.g., sometimes within millimeters). Resonant inductive coupling techniques may thus allow for improved efficiency and power transfer over various distances and with a variety of inductive coil configurations.

The receiver 108 may receive power when the receiver 108 is located in the wireless field 105 produced by the transmitter 104. The wireless field 105 corresponds to a region where energy output by the transmitter 104 may be captured by the receiver 108. The wireless field 105 may correspond to the "near-field" of the transmitter 104 as will be further described below. The transmitter 104 may include a transmit antenna or coil 114 for transmitting energy to the receiver 108. The receiver 108 may include a receive antenna or coil 118 for receiving or capturing energy transmitted from the transmitter 104. The near-field may correspond to a region in which there are strong reactive fields resulting from the currents and charges in the transmit coil 114 that minimally radiate power away from the transmit coil 114. The near-field may correspond to a region that is within about one wavelength (or a fraction thereof) of the transmit coil 114.

As described above, efficient energy transfer may occur by coupling a large portion of the energy in the wireless field 105 to the receive coil 118 rather than propagating most of the energy in an electromagnetic wave to the far field. When positioned within the wireless field 105, a "coupling mode" may be developed between the transmit coil 114 and the receive coil 118. The area around the transmit antenna 114 and the receive antenna 118 where this coupling may occur is referred to herein as a coupling-mode region.

Figure 2:
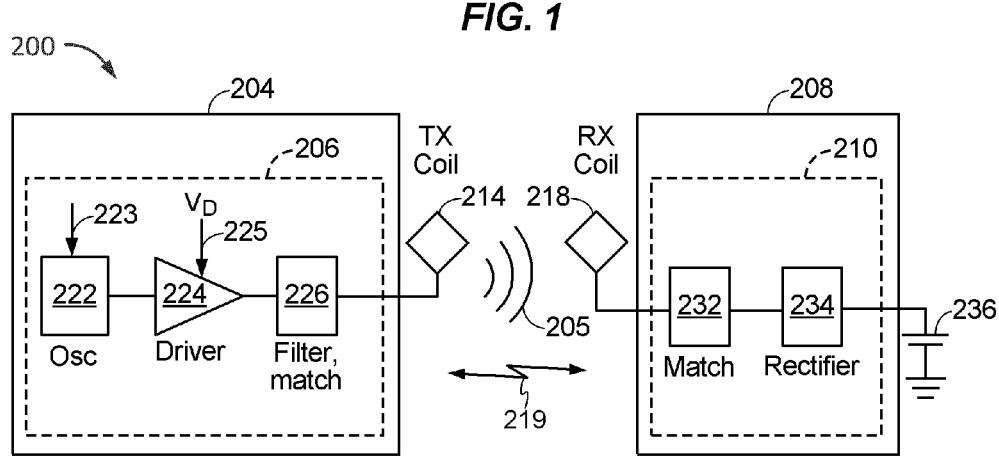
FIG. 2 is a functional block diagram of a wireless power transfer system, in accordance with another example implementation.

FIG. 2 is a functional block diagram of a wireless power transfer system 200, in accordance with another example implementation. The system 200 may be a wireless power transfer system of similar operation and functionality as the system 100 of FIG. 1. However, the system 200 provides additional details regarding the components of the wireless power transfer system 200 than FIG. 1. The system 200 includes a transmitter 204 and a receiver 208. The transmitter 204 may include a transmit circuitry 206 that may include an oscillator 222, a driver circuit 224, and a filter and matching circuit 226. The oscillator 222 may be configured to generate a signal at a desired frequency that may be adjusted in response to a frequency control signal 223. The oscillator 222 may provide the oscillator signal to the driver circuit 224. The driver circuit 224 may be configured to drive the transmit antenna 214 at, for example, a resonant frequency of the transmit antenna 214 based on an input voltage signal (VD) 225. The driver circuit 224 may be a switching amplifier configured to receive a square wave from the oscillator 222 and output a sine wave. For example, the driver circuit 224 may be a class E amplifier.

The filter and matching circuit 226 may filter out harmonics or other unwanted frequencies and match the impedance of the transmitter 204 to the transmit antenna 214. As a result of driving the transmit antenna 214, the transmit antenna 214 may generate a wireless field 205 to wirelessly output power at a level sufficient for charging a battery 236 of the electric vehicle 605, for example.

The receiver 208 may include a receive circuitry 210 that may include a matching circuit 232 and a rectifier circuit 234. The matching circuit 232 may match the impedance of the receive circuitry 210 to the receive antenna 218. The rectifier circuit 234 may generate a direct current (DC) power output from an alternate current (AC) power input to charge the battery 236, as shown in FIG. 2. The receiver 208 and the transmitter 204 may additionally communicate on a separate communication channel 219 (e.g., Bluetooth, Zigbee, cellular, etc.). The receiver 208 and the transmitter 204 may alternatively communicate via in-band signaling using characteristics of the wireless field 205.

The receiver 208 may be configured to determine whether an amount of power transmitted by the transmitter 204 and received by the receiver 208 is appropriate for charging the battery 236.

Figure 3:
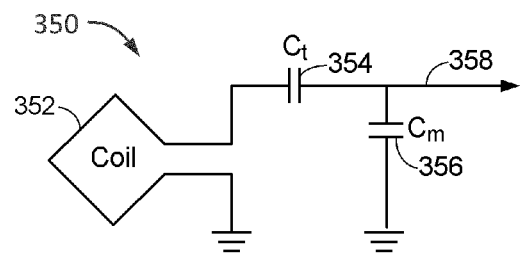
FIG. 3 is a schematic diagram of a portion of transmit circuitry or receive circuitry of FIG. 2 including a transmit or receive antenna, in accordance with some example implementations.

FIG. 3 is a schematic diagram of a portion of the transmit circuitry 206 or the receive circuitry 210 of FIG. 2, in accordance with some example implementations. As illustrated in FIG. 3, a transmit or receive circuitry 350 may include an antenna 352. The antenna 352 may also be referred to or be configured as a "loop" antenna 352. The antenna 352 may also be referred to herein or be configured as a "magnetic" antenna or an induction coil. The term "antenna" generally refers to a component that may wirelessly output or receive energy for coupling to another "antenna." The antenna may also be referred to as a coil of a type that is configured to wirelessly output or receive power. As used herein, the antenna 352 is an example of a "power transfer component" of a type that is configured to wirelessly output and/or receive power.

The antenna 352 may include an air core or a physical core such as a ferrite core (not shown in this figure). Air core loop antennas may be more tolerable to extraneous physical devices placed in the vicinity of the core. Furthermore, an air core loop antenna 352 allows the placement of other components within the core area. In addition, an air core loop may more readily enable placement of the receive antenna 218 (FIG. 2) within a plane of the transmit antenna 214 (FIG. 2) where the coupled-mode region of the transmit antenna 214 may be more powerful.

As stated, efficient transfer of energy between the transmitter 104 (transmitter 204 as referenced in FIG. 2) and the receiver 108 (receiver 208 as referenced in FIG. 2) may occur during matched or nearly matched resonance between the transmitter 104 and the receiver 108. However, even when resonance between the transmitter 104 and receiver 108 are not matched, energy may be transferred, although the efficiency may be affected. For example, the efficiency may be less when resonance is not matched. Transfer of energy occurs by coupling energy from the wireless field 105 (wireless field 205 as referenced in FIG. 2) of the transmit coil 114 (transmit coil 214 as referenced in FIG. 2) to the receive coil 118 (receive coil 218 as referenced in FIG. 2), residing in the vicinity of the wireless field 105, rather than propagating the energy from the transmit coil 114 into free space.

The resonant frequency of the loop or magnetic antennas is based on the inductance and capacitance. Inductance may be simply the inductance created by the antenna 352, whereas, capacitance may be added to the antenna's inductance to create a resonant structure at a desired resonant frequency. As a non-limiting example, a capacitor 354 and a capacitor 356 may be added to the transmit or receive circuitry 350 to create a resonant circuit that selects a signal 358 at a resonant frequency. Accordingly, for larger diameter antennas, the size of capacitance needed to sustain resonance may decrease as the diameter or inductance of the loop increases.

Furthermore, as the diameter of the antenna increases, the efficient energy transfer area of the near-field may increase. Other resonant circuits formed using other components are also possible. As another non-limiting example, a capacitor may be placed in parallel between the two terminals of the circuitry 350. For transmit antennas, the signal 358, with a frequency that substantially corresponds to the resonant frequency of the antenna 352, may be an input to the antenna 352.

In FIG. 1, the transmitter 104 may output a time varying magnetic (or electromagnetic) field with a frequency corresponding to the resonant frequency of the transmit coil 114. When the receiver 108 is within the wireless field 105, the time varying magnetic (or electromagnetic) field may induce a current in the receive coil 118. As described above, if the receive coil 118 is configured to resonate at the frequency of the transmit coil 114, energy may be efficiently transferred. The AC signal induced in the receive coil 118 may be rectified as described above to produce a DC signal that may be provided to charge or to power a load.

Many current wireless vehicle charging systems require the electric vehicle being charged to be stationary, i.e., stopped near or above the wireless charging system such that the electric vehicle maintains presence within the wireless field generated by the wireless charging system for transferring charge. Thus, while the electric vehicle is being charged by such a wireless charging system, the electric vehicle may not be used for transportation. Dynamic wireless charging systems that are capable of transferring power across free space may overcome some of the deficiencies of stationary wireless charging stations.

On a roadway with a dynamic wireless charging system comprising a plurality of the base pads placed linearly along a path of travel, the electric vehicle may travel near the plurality of the base pads while traveling on the road. Should the electric vehicle desire to charge its batteries or source energy to power the electric vehicle while traveling, in order to extend its range or reduce the need to charge later, the electric vehicle may request the dynamic wireless charging system activate the base pads along the electric vehicle's path of travel. Such dynamic charging may also serve to reduce or eliminate the need for auxiliary or supplemental motor systems in addition to the electric locomotion system of the electric vehicle (e.g., a secondary gasoline engine of the hybrid/electric vehicle). As such, dynamic wireless charging systems and methods that efficiently and effectively activate the base pads along a path of travel of the electric vehicle are needed.

Figure 4:
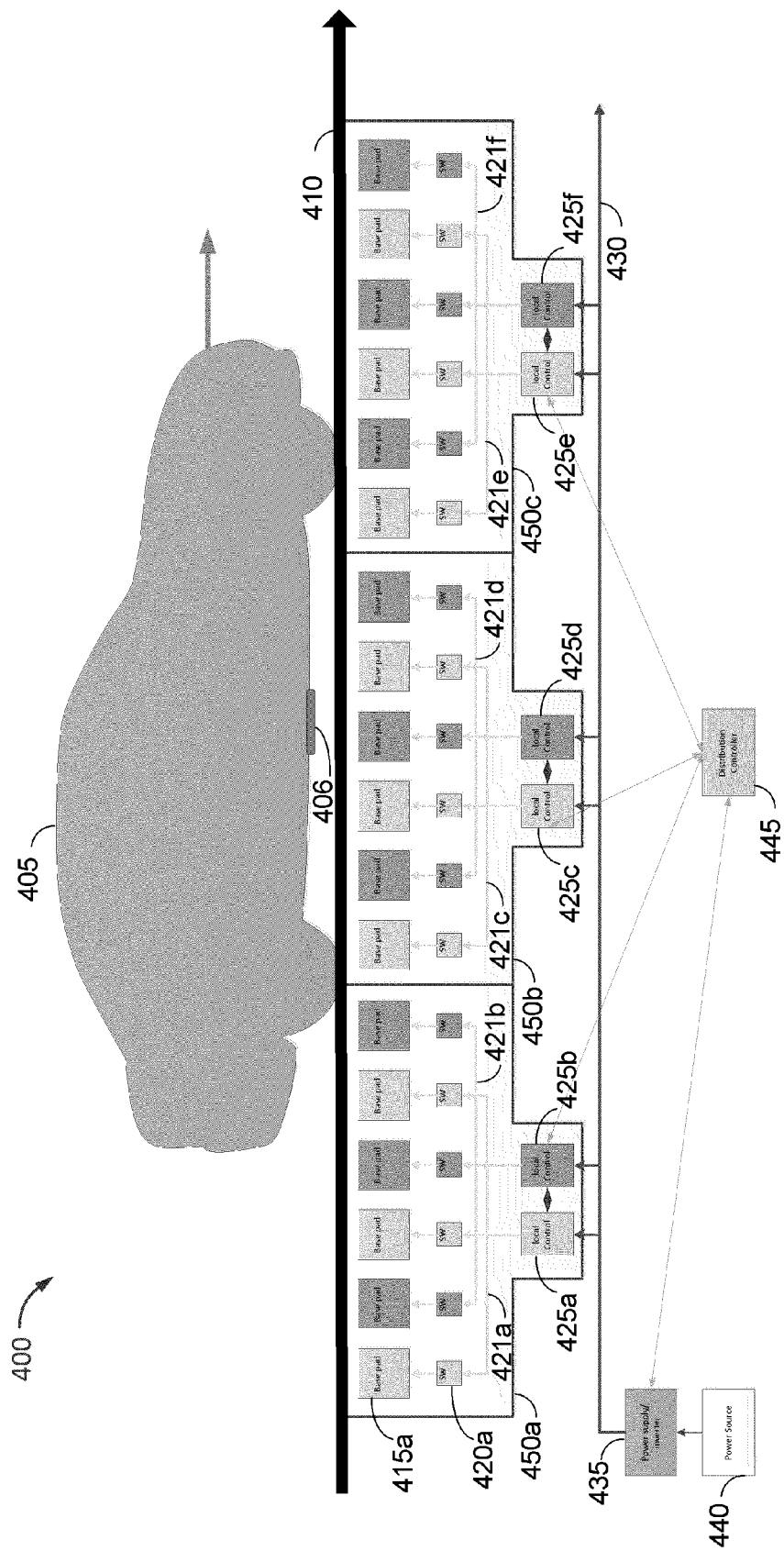
FIG. 4 illustrates a schematic view of an electric vehicle with at least one vehicle pad traveling along a roadway where various components of a dynamic wireless charging system are installed beneath the roadway.

FIG. 4 illustrates a schematic view of an electric vehicle 405 with at least one vehicle pad 406 traveling along a roadway 410 where various components of a paralleled distribution network of a dynamic wireless charging system 400 for providing wireless power to electric vehicles 405 are installed beneath or beside the roadway 410. The roadway 410 is shown as extending from the left side of the page to the right side of the page, with the electric vehicle 405 traveling along the roadway 410 from left to right in the direction of travel. The electric vehicle 405 may comprise one or more vehicle pads 406. As depicted in FIG. 4, the electric vehicle 405 is passing above base pads 415a-415r as installed in the roadway 410 in the direction of travel. In an alternate embodiment, the base pads 415 may be installed on top of the surface of the roadway 410, beside the roadway 410, or flush with the surface of the roadway 410, or in any embodiment which would allow the wireless transfer of energy to electric vehicles 405 traveling along the roadway 410.

The base pads 415a-415r may emit a wireless field (not shown in this figure) when activated and wirelessly transfer power to the electric vehicle 405 via at least one vehicle pad 406. As depicted, directly below the base pads 415a-415r are switches 420a-420r, to which the base pads 415a-415r may be electrically connected. Each of the switches 420a-420r may be further connected to local controllers 425a-425f via distribution circuits 421a-421f. The local controllers 425a-425f may also be connected to a power supply/inverter 435 via a backbone 430. The distribution controller 445 may also be connected to the power supply/inverter 435. The power supply/inverter 435 may be further connected to power source 440. As depicted, groups of base pads 415, switches 420, and local controllers 425 may be components of Base Array Network (BAN) modules 450a-450c. As shown, the respective components of the BAN modules 450 are shaded to indicate respective common current paths (a detailed discussion of the BAN modules 450 is provided above in reference to FIGS. 5a and 5b).

A base pad 415 may comprise a coil capable of generating a wireless field (not shown here) for transferring power wirelessly. As used herein, charging pad and base pad may refer to the same components. In some embodiments, the base pad 415 may comprise an apparatus that is configured to generate the wireless field for transferring wireless power; the apparatus may comprise one or more inductive coils or other devices capable of generating the wireless field. In some other embodiments, the base pad 415 may refer to the individual inductive coils or similar devices capable of generating the wireless field for wireless power distribution. Any structure capable of generating the wireless field to transfer power wirelessly may function as the base pad 415 in the system described herein. Similarly, a vehicle pad 406, as will be discussed below, may similarly describe an apparatus comprising at least one inductive coil or similar device or may indicate the inductive coil or similar device directly.

As the electric vehicle 405 and vehicle pad 406 travel through the dynamic wireless charging system 400 and above individual base pads 415a-415r, distribution controller 445 may communicate with the electric vehicle 405, the power supply/inverter 435, and the local controllers 425a-425f. Dependent upon the position of the electric vehicle 406 in relation to the dynamic wireless charging system 400, the distribution controller 445 may instruct the power supply/inverter 435 to generate a current and distribute it to the backbone 430. The backbone 430 may serve to supply all connected local controllers 425a-425f with current which may be further distributed to the base pads 415a-415r to wirelessly transfer power to an electric vehicle 405.

The local controllers 425a-425f may control the current from the backbone 430 or may regulate the current from the backbone 430. In some embodiments, the local controllers 425 in each BAN module 450 may comprise individual control units capable of independent control from each other. In some other embodiments, the local controllers 425 may in each BAN module 450 may comprise a single, shared control unit or processor that controls both of the local controllers 425 while each local controller maintains independent power distribution components and power inputs from the backbone 435 and the ability to operate and function independently from the operation of the other local controller 425 though sharing a single processor. The controlled or generated current may be distributed by the local controllers 425a-425f to each connected base pad 415a-415r. The distribution circuits 421a-421f may identify the electrical structure through which the current from the local controllers 425a-425f is distributed to the base pads 415a-415r. The switches 420a-420r function to connect each base pad 415a-415r may allow the current supplied by the local controller 425a-425f to reach the connected base pad 415a-415r. The base pads 415a-415r may generate wireless fields when receiving current through a switch 420a-420r from the local controller 425a-425f and may couple to a vehicle pad 406 to wirelessly transfer power to the electric vehicle 405.

During operation, the electric vehicle 405 may travel along the roadway 410 with its vehicle pad 406 positioned and configured to receive power from the base pads 415. Each of the base pads 415a-415r may generate a wireless field. The base pads 415a-415r may couple with vehicle pads 406 passing through the wireless field generated by the base pad 415 and may wirelessly transfer power from the base pads 415 to the vehicle pad 406, where the wireless power may be used by the systems of the electric vehicle 405. In an embodiment, the vehicle pad 406 may comprise one or more vehicle pads 406 positioned at one or more locations along the electric vehicle 405. In an embodiment, the positions of the vehicle pads 406 on the electric vehicle 406 may be determined by the positioning of the base pads 415 in relation to the roadway 410 and the electric vehicle 405 path of travel. In some embodiments, the vehicle pads 406 may comprise at least one of a polarized coupling system (e.g., a double-D coil) and a quadrature coil. In another embodiment, the vehicle pads 406 may comprise combined double-D quadrature coils. In some other embodiments, the vehicle pads 406 may comprise coils of another type. In some other embodiments, the vehicle pads 406 may comprise one of circular coils and solenoidal coils, or a combination of any of the above mentioned coils.

The electric vehicle 405 or its operator may determine that utilizing the dynamic wireless charging system 400 is beneficial. In some embodiments, utilizing the dynamic wireless charging system 400 may require preliminary communications between the electric vehicle 405 and the charging system 400. These initial communications may involve the distribution controller 445. These communications may initiate the charging procedure for both the electric vehicle 405 and the dynamic wireless charging system 400 and verify the electric vehicle 405 may use the dynamic wireless charging system 400. Additionally, the preliminary communications may involve activating the vehicle pad 406 of the electric vehicle 405 and indicating to the electric vehicle 405 or its operator the proper alignment of the path of travel of the electric vehicle 405 so it may travel above the base pads 415a-415r. In an alternate embodiment, the distribution controller 445 may not be involved with the initial communications and may instead only be involved with communicating with the electric vehicle 405 to determine the electric vehicle 405 position within the dynamic wireless charging system 400 as it travels above the base pads 415*a*-415*r*.

While passing through the wireless fields generated by the base pads 415, the vehicle pad 406 may be selectively connected to a charging circuit configured to charge an energy storage device (not shown in this figure) using power received by the vehicle pad 406 or directly to the electric vehicle 405 to selectively power the electronics of the electric vehicle 405 and provide power for locomotion. These selections may be made by the operator of the electric vehicle 405, by the electric vehicle 405, or by the dynamic wireless charging system 400. Thus, the wireless power received by the vehicle pad 406 may enable the electric vehicle 405 to extend its range and reduce its need for a subsequent charging cycle. The level of the coupling between the base pads 415 and the vehicle pad 406 may impact the amount of power transferred or the efficiency with which the power is transferred to the electric vehicle 405 via the wireless field.

The distribution controller 445 may communicate with the power supply/inverter 435 and the local controllers 425*a*-425*f* to provide communications and control. In another embodiment, the distribution controller 445 may also be communicated with to the electric vehicle 405. In some embodiments, the communications and control connection between the distribution controller 445, the local controllers 425, the power supply/inverter 435, and electric vehicle 405 may be wireless, such that the distribution controller 425 and the electric vehicle 405 need not be physically connected, or wired. In some additional embodiments, the distribution controller 445 may be integrated into the local controllers 425 or any of the power generating devices (power supply/inverter 435 and power source 440). The distribution controller 445 may function to coordinate the activation and deactivation of base pads 415 and may coordinate any communications or actions between multiple BAN modules 450. The coordination from the distribution controller 445, combined with the more localized current distribution with the local controllers 425 regulating the current flow to specific base pads 415 helps create a more efficient and more responsive dynamic wireless charging system 400, as the current is already on a path to the base pads 415, simply needing a signal from the local controller 425 and/or the distribution controller 445 to have the switch 420 couple the base pad 415 to the current and activate it. Distribution controller 445 may operate to control the activation of individual base pads 415 as an electric vehicle 405 travels along the roadway 410 using dynamic wireless charging system 400. The distribution controller 445 may provide controls to the power source 440 and power supply/inverter 435 based upon the demand of the base pads 415 and the need to provide a transfer of power at a given moment. In another embodiment, the distribution controller 445 may simply coordinate communications between BAN modules 450 or local controllers 425, while the local controllers 425 control the base pad 415 sequencing. In some other embodiment, the distribution controller 445 may activate the BAN module 450, but leave the timing of base pad 415 activations to the local controller 425. Alternatively, the distribution controller 445 may communicate only non-critical information to the local controllers 425 and not provide base pad 415 activation information.

After activating the power supply/inverter 435, the distribution controller 445 may obtain information regarding the vector or path of the electric vehicle 405 and the speed of the electric vehicle 405. The distribution controller 445 may obtain this information from the electric vehicle 405 itself or from various sensors or load analysis of the base pads 415. In relation to the location of the electric vehicle 405 and the vehicle pad 406, the distribution controller 445 may send signals to the local controllers 425 in the vicinity of the electric vehicle 405 to activate specific base pads 415 dependent upon the location of the electric vehicle 405 at a moment in time. For example, as indicated by the moment captured in FIG. 4, the distribution controller 445 may be communicating with the electric vehicle 405 to determine the position of the vehicle pad 406 in relation to the dynamic wireless charging system 400, local controllers 425*c* and 425*d* to command them to activate base pads 415*j* and 415*k* to wirelessly transfer power to the vehicle pad 406.

As the electric vehicle 405 continues to travel down the roadway 410 towards the right side of the page, the distribution controller 445 will continue to communicate with the electric vehicle 405 and successively send commands to local controllers 425*c*-425*f* so as to activate base pads 415*l*-415*r* at the appropriate times according to when the electric vehicle 405 is above the respective base pad 415. In an alternate embodiment, distribution controller 445 may communicate with local controllers 425 down the roadway 410 to coordinate power transfers to the electric vehicle 405. As another alternative, each of the BAN modules 450 may sense the presence of the electric vehicle 405 and autonomously and selectively activate one of the base pads 425 based on a detected presence of the electric vehicle 405. In another embodiment, the BAN modules 450 may receive a signal from a neighboring BAN module 450. This signal may comprise information regarding the electric vehicle 405 speed, position, and direction, or may comprise a signal to activate. The received signal may come directly from the neighboring BAN module 450 or via the distributed controller 445.

The power source 440 and power supply/inverter 435, as discussed above, may provide the power used by the dynamic wireless charging system 400. As shown, the power source 440 and the power supply/inverter 435 may be located off the roadway 410 and a distance away from a path of travel. This location may help eliminate the need to run high voltage power lines supplying alternating current (AC) power along the length of a roadway 410 itself which may provide a safety challenges and make installation and maintenance of the roadway 410 and dynamic wireless charging system 400 dangerous. Additionally, placing the power source 440 and the power supply/inverter 435 in a single location off the roadway 410 itself may help reduce the cost of the dynamic wireless charging system 400 by allowing a single power source 440 and power supply/inverter 435 to be used with multiple BAN modules 450 and the base pads 415 contained therein. As such, current generated from the power source 440 and power supply/inverter 435 may be distributed amongst various base pads 415 over a greater distance, which may reduce the number of power sources 440 and power supply/inverters 435 required for a dynamic wireless charging system 400 serving a large expanse of roadway 410. The power source 440 and the power supply/inverter 435 may be installed in a manner that is easy to maintain, service, or replace, e.g., located in a rack or installed in an accessible housing. Such an installation may ensure that the highly complex components of the dynamic wireless charging system 400 may be more easily accessed than the lower complexity components that are installed in the roadway 410. In some embodiments, the distributed controller 445 may be installed within the enclosure with the power source 440 and the power supply/inverter 435.

The power source 440 and the power supply/inverter 435 may be sized to provide sufficient current to a large number of base pads 415. For example only, the power source 440 and the power supply/inverter 435 may be sized at 25 or 50 kW. In another embodiment, the power source 440 and the power supply/inverter 435 may be of a size greater than 50 kW. The size of the power source 440 and the power supply/inverter 435 may be determined by the number of base pads 415, the number or type of electric vehicle 405 to be charged, and/or the number of local controllers 425 being supplied by the power source 440 and power supply/inverter 435. A 25 kW power supply/inverter may be sufficient to provide a wireless charge to between one and three electric vehicles 405 concurrently. A larger number of local controllers 425 being supplied by the power source 440 and power supply/inverter 435 may require these components be of size greater than 50 kW. In an embodiment, the power source 440 and power supply/inverter 435 may produce the 85 kHz current that may be required by the base pads 415 to produce wireless fields capable of transferring energy. In an alternate embodiment, a current of a higher or lower kHz value may be generated dependent on the base pads 415 being utilized to transfer wireless power.

The backbone 430 may connect the power source 440 and power supply/inverter 435 to local controllers 425 that receive a current from the power supply/inverter 435 an the power source 440. The backbone 430 may be of any length such that the current supplied to the local controllers 425 may not be deteriorated or degraded due to interference or distance of transmission so as to make the current unusable by the local controllers 425, switches 420, or base pads 415 or such that the current supplied to the base pads 415 may not create difficulty for generating wireless fields with the current, for example, if the required voltage becomes too high. The backbone 430 may be a loop conductor that distributes the high frequency (HF) power and may be capable of synchronizing base pads that are near each other to a single phase. The backbone 430 may be considered a phase reference that also distributes the power. Accordingly, the backbone 430 may be used for phase measurements or for keeping associated components (e.g., local controllers 425) in phase alignment. Additionally, the backbone 430 may have a constant magnitude, which may provide for the measuring of real power draw, etc., of associated components. In an embodiment, the backbone 430 may be constructed in a manner such that the local controllers 425 and any other devices sourcing power from the backbone 430 by coupling with the backbone 430 wirelessly. This wireless coupling may be similar to the coupling seen in transformers or in wireless charging. This wireless manner of coupling to source power may enhance the safety, reliability, and durability of the power transfer between the backbone 430 and the local controllers and other devices sourcing power from the backbone 430. Another benefit of a wireless connection between the backbone 430 and the local controllers 425 may be the ability to locate the local controllers 425 anywhere along the backbone 430 or easily move the local controllers 425 without requiring any physical modifications to either component. In another embodiment, the backbone 430 may be constructed such that local controllers 425 and any other devices sourcing power from the backbone 430 physically connect to the backbone 430 via an electrical connection.

The local controllers 425a-425f receive a current from the backbone 430 and distribute this current to the base pads 415a-415r to which the local controllers 425a-425r are electrically connected via distribution circuits 421a-421f and switches 420a-420r. In some embodiments, the local controllers 425a-425f may function as an on/off control point or switch to allow current to flow from the backbone 430 to the respective distribution circuit 421a-421f. In another embodiment, the local controller 425a-425f may perform more regulatory control Additionally, the local controller 425 may produce a variable output current from the backbone 430 current. For example, the local controller may produce any amount of output current between zero and the maximum current available at the backbone 430 to feed to the base pads 415, e.g., the local controller may produce anywhere between 0% and 100% of the coupled voltage or current from the backbone 430 to feed to the base pads 415. In some other embodiment, the local controller 425a-425f may each comprise a tuning circuit or network to tune the current flowing to the base pad 415 currently activated. In an embodiment, the tuning circuit or network may be configured to function with only one base pad 415 being activated. In another embodiment, the tuning circuit or network may be configured to function with multiple base pads 415 being activated. An alternate embodiment may provide that the tuning circuit or network may be configured to function with a single base pad 415 or with multiple base pads 415 being activated and receiving a current from the local controller 425.

When the local controllers 425a-425f receive a signal from the distribution controller 445 to activate a specific base pad 415, the respective local controller 425 that is connected to the base pad 415 to be activated may generate a signal to the switch 420 that is between the base pad 415 to be activated and the local controller 425. For example, at the moment depicted in FIG. 4, local controller 425c may receive a signal from the distribution controller 445 to activate base pad 415i. In one embodiment, in response, the local controller 425c may be configured to generate a signal to the switch 420i to instruct the switch 420i to connect base pad 415i to the distribution circuit 421c. In another embodiment, the local controller 425 may send the received signal on to the switch 420. In some other embodiment, distribution controller 445 may communicate directly with the switch 420 and the local controller 425. At the same time, local controller 425d may be receiving a signal from the distribution controller 445, which may cause the local controller 425d to generate a signal to the switch 420j to instruct the switch 420j to connect base pad 415j to the distribution circuit 421d. As the vehicle 405 continues in the direction of travel, local controller 425d-425f may receive commands from the distribution controller 445 to activate specific base pads 415k-415r. In response to the commands, the specific local controller 425 that distributes power to the indicated base pad 415 may instruct the switch 415 corresponding to the base pad 415 to connect the base pad 415 to the respective distribution circuit 421d-f. The local controllers 425a-425f may further control the current from the backbone 430 or may regulate the current from the backbone 430.

The switches 420a-420r may control the flow of current from the distribution circuits 421a-421f and the local controllers 425a-425f to the respective base pads 415a-415r connected downstream of the switches 420a-420r. Switches 420a-420r may comprise a device or circuitry that allows current from the local controller 425 to pass to the respective base pad 415a-415r to which the switch 420 is connected. In an embodiment, the switch 420 operates in response to a signal from the local controllers 425. This embodiment may provide for a lower cost system where the local controller 425 may be less complex and need not control its power distribution directly. In another embodiment, the local controller 425 may selectively distribute the current received from the backbone 430 to a specific switch 420 and base pad 415 instead of distributing it blindly to the entire distribution circuit 421. In another embodiment, the switch may pass current to the connected base pad 415 in response to a signal from the distribution controller 445. In some embodiments, the switch 420 may pass current to the base pad 415 by default without receiving a signal from another device. In an embodiment, when the local controller 425 draws current from the backbone 430 to distribute it to one of the connected base pads 415, the local controller 425 may distribute the current to the entire distribution circuit 421. In that embodiment, switches 420 may be used to couple specific base pads 415 to the current of the distribution circuit 421 based upon the signal or the default condition. In another embodiment, the distribution circuits 421 may comprise the wiring or other circuitry necessary to connect individual switches 420 to the local controllers 425 based on what base pads 415 are to receive current. In some embodiments, the switches 420a-420r may be incorporated into the base pads 415a-415r or into the local controllers 425a-425f, or into the distribution circuits 421a-421f.

The base pads 415a-415r may be connected directly to respective switches 420a-420r and may be located directly below the roadway 410 such that they may be capable of providing wireless power to electric vehicles 405 passing along the roadway 410 above. The base pads 415a-415r of FIG. 4 may be depicted as being adjacent to each other. In another embodiment, the base pads 415a-415r may be installed in an overlapping manner (as referenced in FIG. 7). In some other embodiment, the base pads 415 may be installed in a manner where some base pads 415 overlap with other base pads 415 while some base pads 415 may be adjacent to without overlapping other base pads 415.

As depicted, the base pads 415 from consecutive local controllers 425 may be interleaved or interlaced such that a single local controller 425 never provides power to consecutive base pads 415. Thus, the base pads 415 from a first local controller 425 may be proximally interleaved or interlaced with the base pads 415 controlled by a second local controller 425 when the two local controllers 425 are within the same base array network 450, as will be described in more detail below. The interleaving of the base pads 415 means that alternating base pads 415 are powered by different local controllers 425, and one local controller never needs to power two base pads 415. Providing a plurality of local controllers 425 that may feed multiple base pads 425 may provide for a more cost effective system where the local controllers 425 may be utilized in a more efficient manner as they will be in use while supplying current to multiple base pads 425. Additionally, preventing a single local controller 425 from providing current to consecutive base pads 415 helps reduce the power rating requirements of the all the components between the backbone 430 and the base pads 415, as each component therein need only be capable of handling the current load of a single base pad 415. In a non-parallel and non-interleaved distribution system, any device that may feed current to more than a single base pad 415 may need to be rated at the higher current required to feed two or more base pads 415 concurrently, as may be necessary to provide smooth power transfers across multiple base pads 415.

Figure 5A:
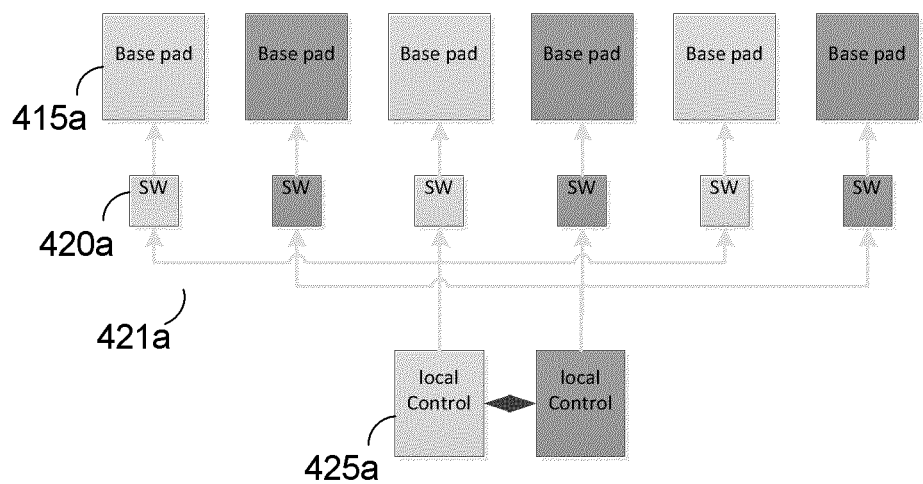
FIG. 5a illustrates a schematic view of a modular base array network (BAN) module comprising a paralleled power distribution network.

FIG. 5a illustrates a schematic view of the base array network (BAN) modules 450 and the components comprising the BAN module 450. FIG. 5a depicts BAN module 450 as a modular device comprising a plurality of base pads 415a-415f, a plurality of switches 420a-420f, and a plurality of local controller 425a and 425b within a modular enclosure (not shown in this figure). As depicted, local controller 425a may be connected to distribution circuit 421a, which is connected to switches 420a, 420c, and 420e, which lead to base pads 425a, 425c, and 425e. Similarly, local controller 425b may be connected to distribution circuit 421b, switches 420b, 420d, and 420f, and base pads 425b, 425d, and 425f, in that order. As shown, the respective components of the BAN modules 450 are shaded to indicate the common power distribution paths. The base pads 415 are laid out in a manner such that base pads 415 from different local controllers 425 alternate in their layout in the BAN module 450. For example, base pads 415a, 415c, and 415e that may be connected to local controller 425a via switches 420a, 420c, and 420e, respectively, may be installed within the BAN module 450 in an interleaved manner with base pads 415b, 415d, and 415f that may be connected to local controller 425b via switches 420b, 420d, and 420f, respectively. Therefore, the pattern of installed base pads 415 in order of electric vehicle 405 travel may be 415a, 415b, 415c, 415d, 415e, and 415f.

The BAN module 450 as depicted in FIG. 5a may be roughly two meters long. Each of the local controllers 425a and 425b may function to distribute current to a subset of the base pads 415a-415f via distribution circuits 421a and 421b and switches 420a-420f. The local controllers 425a and 425b may be connected to a distribution circuit 421a and 421b, respectively. Thus, each local controller 425 may distribute received current via a respective distribution circuit 421. Accordingly, distribution circuit 421a may connect local controller 425a to three or more base pads 415a, 415c, and 415e via three or more switches 420a, 420c, and 420e, while distribution circuit 421b may connect local controller 425b to three or more base pads 415b, 415d, and 415f, via three or more switches 415b, 415d, and 415f. These connections may allow the local controllers 425 to distribute a current received from the backbone 430 to each of the switches 420. These connections also may allow the local controller 425 to distribute a control signal received from the distribution controller 445 to a destination device.

The switches 420a-420f may function to selectively couple the base pads 415a-415f, respectively, to the respective distribution circuit 421. The selective coupling may be in response to a signal received from one of local controllers 425a or 425b or from the distributed controller 445. When coupled, the base pad 415 may be capable of receiving a current from the local controller 425 via distribution circuit 421. In an embodiment, the local controllers 425a-425f may control a current flow to the base pads 415a-415r and may control the direction of the current flow through the base pads 415a-415r. In an alternate embodiment, the switches 420a-420r, the distribution circuit 421, or the base pads 415a-415r themselves may control the direction of the current flow through the base pads 415a-415r. The control of the current flow direction through the base pad 415 may provide for minimizing mutual coupling and cross coupling between concurrently activated base pads 415 and adjacent base pads 415. The controlling of the current by the distribution circuits 421, local controllers 425 or the switches 420 discussed above may comprise at least one of controlling the magnitude of the current or the phase of the current being sent to the base pads 415. Such controlling by the distribution circuits 421, the local controllers 425, or the switches 420 may provide for the manipulation of the wireless fields generated by the base pads 415. In some embodiments, the phase of the current flow through the connected base pad 415 may be limited to one of zero or 180 degrees. In some other embodiments, the phase of the current flow may be any value between zero and 360 degrees. In operation, the BAN 450 of FIG. 5a may operate as a sub-tree network of the dynamic wireless charging system 400. The BAN module 450 may function as a self-contained unit where its internal components may be coordinated and preassembled and connected such that the BAN module 450 is designed to distribute and control the current distribution over a limited distance. As depicted, internally there are two local controllers, 425a and 425b, two distribution circuits 421a and 421b, switches 420a-420f, and base pads 415a-415f.

The local controllers 425 may receive a power and control from a power source 440, inverter 435, or distributed controller 445 outside the BAN module 450. The local controllers 425a and 425b may function to selectively and controllably distribute that power and control to one or more of the internal components of the BAN module 450, such as distribution circuit 421a, switches 420a, 420c, and 420e, and subsequently base pads 415a, 415c, and 415e, as to efficiently and effectively charge the electric vehicle 405 via vehicle pads 406. For example, local controller 425a may receive a current from a backbone 430 and a distribution signal from a distribution controller 445. The distribution signal may represent a signal indicating which components to activate at a given moment in order to function appropriately in the dynamic wireless charging system 400 as an electric vehicle is traveling through the system.

In some embodiments, the local controllers 425a and 425b may not receive a distribution signal, and instead may receive a current only when they are to distribute the current to a downstream component. In some other embodiments, the local controllers 425a and 425b may not receive a current but rather be configured to generate a current from an input power in response to a distribution signal or in response to an input power being provided. In some other embodiments, the local controllers 425 may be a combination of a power supply/inverter 435 and current distribution equipment, and may be configured to provide power to a base pad 415 upon its own determination of when to activate base pads 415 (e.g., using load monitoring or direct communications with the electric vehicle 405). In an additional embodiment, the local controller 425 may be configured to provide power to the base pads 415 in response to a signal from the electric vehicle 405. The signal from the electric vehicle 405 may comprise a direct communication from the electric vehicle 405 to the local controller 425 via wireless communications (e.g., Bluetooth, Wi-Fi, etc.). In another embodiment, the local controller 425 may be configured to provide power to the base pads 415 in response to a load monitoring communication or signal, wherein the base pads 415 may determine the existence or position of the electric vehicle 405 based on one of an induced voltage or current signal from the vehicle pad 406. In some other embodiments, the local controller 425 may receive a signal to provide power to the base pads 415 that may be generated by a component of the previous BAN module 450 (e.g., base pad 415 or local controller 425 of a previous BAN module 450) that is communicated to the current local controller 425. This communication may be any wired or wireless communication method. This communication may comprise information informing the current local controller 425 when to start providing power or may comprise information regarding the electric vehicle 405 position, speed, and/or direction. These communications may be direct between local controllers 425 of the same or different BAN modules 450, or may be directed through the distribution controller 445 and then to other local controllers 425. For example, in one embodiment, a local controller 425a within BAN module 450a may communicate to local controller 425b within BAN module 450a or local controller 425c within BAN module 450b to start charging. In another embodiment, the same local controller 425a may communicate to local controller 425b or local controller 425c information regarding the electric vehicle 405 speed, position, or direction. In some other embodiments, the local controller 425 of the BAN module 450 may detect a voltage or current signal induced from the vehicle pad 406 from a previously enabled BAN module and not rely upon communications between local controllers. In such embodiments, the BAN module may receive the induced voltage or current signals directly from the base pads 415 of the previous BAN module. In some additional embodiments, the local controller 425 of the BAN module 450 may detect an induced voltage or current signal from a previously enabled BAN block.

In an embodiment, local controllers 425a and 425b may distribute a received current and/or communication to the respective distribution circuit 421a and 421b in their entirety in response to a signal from a distribution controller 445. In another embodiment, the local controllers 425 may distribute the current and communications to a specific switch via distribution circuit 421 wherein the local controller 425 may have the ability to control the power distribution directly. In some other embodiments, the local controllers 425 may distribute the received current by default without need of the signal from the distribution controller 445. In some embodiments, the local controllers 425 within a BAN module 450 may be configured to communicate with each other, while other embodiments may prohibit such interactions and keep the local controllers 425 insulated from each other. The local controllers 425 may provide fast base pad 415 sequencing where the current required for a base pad 415 to generate a wireless field is essentially awaiting only a signal instructing to couple the base pad 415 to the distribution circuit 421 and the current waiting therein, thus eliminating any transfer times or intermediate control times that may occur during bilateral communication.

The distribution circuit 421a may then, as discussed in more detail with reference to FIG. 4 above, convey the current to all the switches 420 to which it is connected, e.g., switches 420a, 420c, and 420e. In some embodiments, the distribution circuit 421a itself may not comprise any internal controls or may be unable to direct the current in anything but a predetermined path or base pad activation sequence. In another embodiment, the distribution circuit 421a may comprise controls and components to allow it to selectively distribute the current along a dynamic path that the distribution circuit 421a may control.

The switches 420a, 420c, and 420e may distribute received current to the respective base pads 415a, 415c, and 415e. The switches 420 may respond to a signal from the local controller 425 of distribution controller 445 to activate the base pad 415 to which the switch 420 is connected. In some embodiments, each switch 420a-420f may have a current connection with their respective local controller 425 through the respective distribution circuit 421 and a separate communication or control connection with their respective local controller 425. In some other embodiment, both the power wiring and the communication or control connection may integrated into the distribution circuits 421a and 421b to simplify wiring in the BAN module 450. In another embodiment, the signaling between the local controllers 425 and switches 420 may be such that there is only a single circuit between the local controllers 425 and switches 420. In some embodiments, the switches 420 may function to disconnect a base pad 415 from the distribution circuit 421 so the base pad 415 not in use does not affect the tuning or the current power path. In some embodiments, the switch 420 may function to disconnect the base pad 415 into a sensor capable of reflected load monitoring.

As discussed briefly above, any of the local controller 425, distribution circuit 421, switch 420, and base pad 415 may be configured to selectively control the direction of current flow through the base pad 415. This may be performed by reversing connection or more complicated circuitry or conversion processes.

In use, modular device BAN module 450 may be a self-contained component that may be installed into a dynamic wireless charging system 400. The BAN module 450 and the dynamic wireless charging system 400 may be designed such that the BAN module 450 may be installed and/or removed with minimal cost and difficulty. For example, in a simplistic dynamic wireless charging system 400, the BAN module 450 may be a "drop in" module configured to wirelessly connect with all external components (e.g., backbone 430, distribution controller 445, and electric vehicle 405). Maintaining wireless connections with all external components may simplify installation or removal and may reduce installation and maintenance costs where physical connections may be minimized. In some other embodiment, the BAN module 450 may comprise individual connections for each input required or expected. For example, in one embodiment, the BAN module 450 may comprise a power connection to receive input current for each local controller 425 therein and a communication signal for each local controller 425 to receive a communication from the distribution controller 445 and/or electric vehicle.

Additionally, the internal, parallel distribution structure of a BAN module 450 provides distinct features in operation of the dynamic wireless charging system 400. In an embodiment where no local controller 425 may provide power to more than one base pad 415 concurrently, the components of the power distribution path between the base pad 415 and the backbone may be sized only to accommodate a single base pad 415 demands. Thus, the components used in that power distribution path need only be rated for the single load, helping reduce the costs. Additionally, the interleaved layout of the base pads 415 may help provide smoother transitions between base pads 425 where separate local controllers 425 may be responsible for providing the power to the adjacent (or overlapping) base pads 415. An interleaved layout of base pads 415 may also provide for better component usage. Without parallel power paths, each local controller 425 may provide power to a single base pad 415. In a parallel structure, a single local controller 425 may not provide power to multiple base pads 415. Thus, the local controller 425 may sustain additional use over local controllers 425 in non-paralleled systems, further increasing the value and benefit of a paralleled distribution.

Figure 5B:
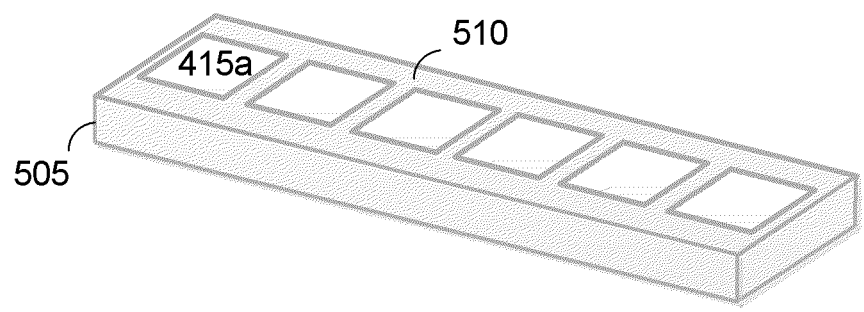
FIG. 5b shows an embodiment of the base array network (BAN) module depicted in FIG. 5a as contained within an example of a modular enclosure.

FIG. 5b shows an example of an embodiment of the BAN module 450 module as contained within a modular enclosure. FIG. 4b may show the BAN module as a complete and integrated unit. As shown, the BAN module 450 may comprise a rectangular enclosure 505 containing therein the components of FIG. 5a, including the base pads 415a-415f, the switches 420a-420f (not shown in this figure), the distribution circuits 421a and 421b (not shown in this figure), and the local controllers 425a and 425 (not shown in this figure). The enclosure may be of concrete or any other material such that the components therein may remain protected from environmental elements and improper interference, either physical or electrical. However, the enclosure material may not be affected significantly by the magnetic fields produced by the base pads 415, nor may the material significantly affect the magnetic fields produced by the base pads 415. Additionally, the material may maintain the integrity of the components and connections within the BAN module 450. As shown, the six base pads 415a-415f may be visible along the top surface 455 of the BAN module 450 in sequential order in the direction of travel of electric vehicle 405. In another embodiment, the BAN module 450 may be contained within a modular enclosure of any shape as determined by the application.

The BAN enclosure may function to protect the components of the BAN module 450 and simplify the implementation of the components therein in a dynamic wireless charging system 400. Utilizing the BAN module 450 and enclosure 505 may provide for centralized connection points and ensure the components therein are properly functioning, with internal connections having been tested and verified to be correct.

The BAN enclosure 505 may be used to create a module that may be easily inserted into a standard dynamic wireless charging system 400 and, as discussed above, simplify installation, removal, maintenance, and reduce associated costs. Installation and removal may be simplified, and thus associated costs reduced where the modular component is of a standard shape and physical connections are minimized or standardized. In an embodiment, the BAN enclosure 505 will be installed into a roadway 410 such that the top surface 510 of the enclosure 505 is flush with the top surface of the roadway 410. In such an embodiment, the top surface 510 of the BAN enclosure 505 may expose the top surfaces of the base pads 415a-415f as shown or may cover the top surfaces of the base pads 415a-415f. Leaving the top surfaces of base pads 415 exposed may increase the power transfer capable by the base pads 415 by reducing any intermediate elements that may introduce interference or other issues. However, leaving the top surfaces of the base pads 415 exposed may increase risk of damage to the base pads 415. In another embodiment, the BAN enclosure 505 may be installed below the roadway 410 such that no portion of the BAN module 450 and BAN enclosure 505 is exposed in the roadway 410.

Figure 6:
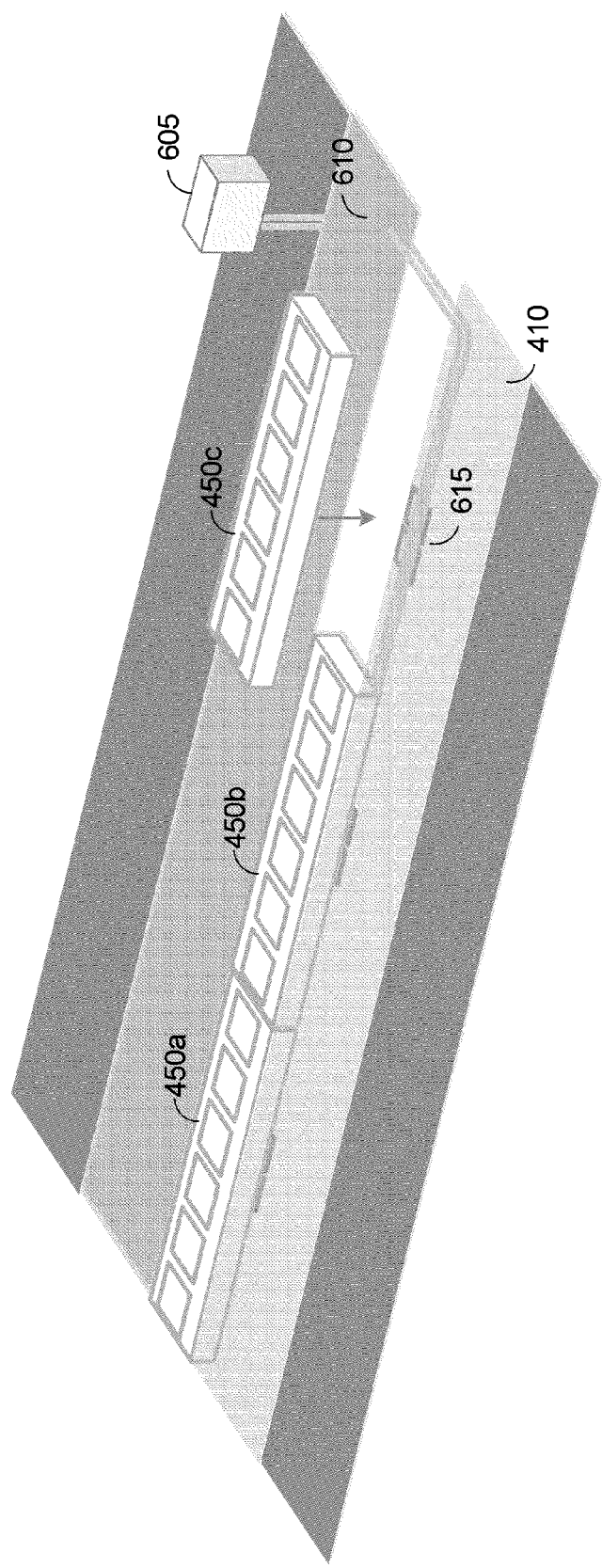
FIG. 6 illustrates an example of an installation of multiple BAN modules from FIG. 5 in a roadway while connected to a conduit and an enclosure.

FIG. 6 illustrates an example of an installation of multiple BAN module 450 modules in a roadway 410 being connected to a conduit 610 and an enclosure 605. FIG. 6 shows a roadway 410 across the page. In the center of the roadway 410 is a strip within which is located the BAN modules 450a and 450b. As shown, BAN modules 450a and 450b are already installed into the roadway 410, with BAN module 450c being shown above the roadway 410 indicating installation alongside BAN module 450b. In some embodiments, connection 615 may be located beneath the BAN modules 450, as seen below BAN module 450c. In another embodiment, connection 615 may be located at the side of the BAN module 450, or at any other location relative to the BAN module 450 conducive to or feasible for installation. The backbone connection 615 is shown at conduit 610 below where the BAN module 450 may be installed in the roadway 410. Alternatively, the backbone connection 615 may not be present in applications where power transfer between the BAN modules 450 and the backbone 430 is via a wireless connection (e.g., inductive, etc.). The conduit 610 runs along the length of the roadway 410 underneath the BAN modules 450. At the end of the length of the BAN modules 450a-450c, the conduit 610 runs across the roadway to the side of the road and then vertically into the enclosure 605.

The components shown in FIG. 6 are an example of how the components of dynamic wireless charging system 400 may be installed along a stretch of roadway 410. The enclosure 605 along the side of the roadway 410 may contain at least one of power supply/inverter 435, power source 440, and distribution controller 445. As described above, the conduit 610 runs from the enclosure 605 down below the surface and to the center of the roadway 410, at which point it turns and travels down the length of the roadway 410 a given distance. In some embodiments, the conduit 610 may be installed along the side of the roadway 410 or between the center and the side of the roadway 410, or in any other location along the path of the roadway 410 such that BAN modules 450 may be connected to the conduit 610. The conduit 610 may comprise the backbone 430 by which current may be conveyed from the power supply/inverter 435 and power source 440 in the enclosure 605 to each of the installed BAN modules 450. Alternatively, conduit 610 may represent a communication path by which communications between the distribution controller 445 within enclosure 605 and other dynamic wireless charging system 400 components communicate. In an alternate embodiment, conduit 610 may provide both backbone 430 and communication pathways.

FIG. 6 provides an indication of the simplicity of installation involved using the modular BAN module 450 modules. Installation of the dynamic wireless charging system 400 may involve only installing three individual components: the enclosure 605 containing distribution controller 445, power source 440, and power supply/inverter 435, the conduit 610 comprising the backbone 430 and potentially communication wiring, and the BAN modules 450. Maintaining the distribution controller 445, power source 440, and power supply/inverter 435 in enclosure 605 alongside the roadway 410 as opposed to beneath the roadway 410 may maintain ease of maintenance by allowing these components to be more accessible in the need of servicing or maintenance. Installing the conduit 610 beneath the roadway 410 may provide for ease of connectivity to BAN modules 450 and additional safety by having the power run the length of the system under the roadway 410 where accidental exposure should be limited. Maintenance and installation costs of the BAN module 450 may be reduced where connections are minimized and the connections of the components of BAN module 450 are completed when the module 450 is assembled or constructed.

Figure 7:
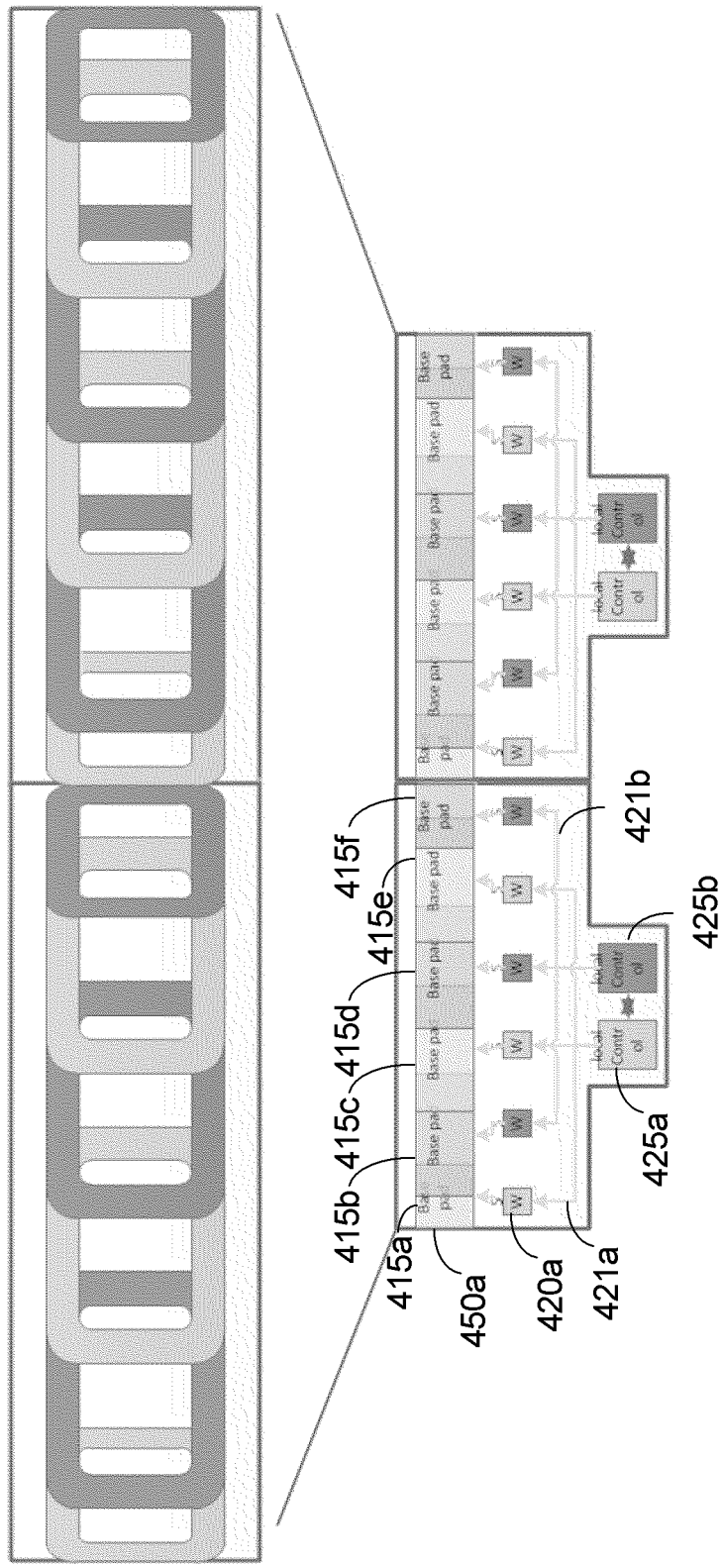
FIG. 7 depicts a schematic and corresponding perspective view of two consecutive examples of embodiments of BAN modules of FIGS. 4-6.

FIG. 7 depicts a schematic and corresponding perspective view of two consecutive example embodiments of BAN modules 450. As discussed above, each of the BAN modules 450 comprise a plurality of base pads 415, a plurality of switches 420, distribution circuits 421, and a plurality of local controllers 425. Specifically, BAN module 450a comprises base pads 415a-415f, switches 420a-420f, distribution circuits 421a and 421b, and local controllers 425a and 425b. BAN module 450b comprises base pads 415g-415l, switches 420g-420l, distribution circuits 421c and 421d, and local controllers 425c and 425d. Each local controller 425a and 425b is connected to distribution circuit 421a and 421b, respectively, which connects each local controller 425a and 425b to half of the base pads 415 (base pads 415a, 415c, and 415e to local controller 425a, base pads 415b, 415d, and 415f to local controller 425b) via switches 420 (switches 420a, 420c, and 420e to local controller 425a, switches 420b, 420d, and 420f to local controller 425b) of the BAN module 450a. A similar connection structure applies for BAN module 450b. The BAN modules 450 differ from depictions in other figures by showing the base pads 415 in an overlapping orientation. This variation is intended only to present an additional embodiment of the layout of the base pads 415 within the BAN module 450 and is not intended to be limiting. Each base pad 415 not on the ends of the BAN modules 450 may overlap with two other base pads 415, while the two base pads on the ends of the BAN modules 450 may overlap with only one other base pad 415. The overlapping layout of the base pads 415 may not affect the electrical connections or layout of the base pads 415, the switches 420, the distribution circuits 421, or the local controllers 425. The schematic shows each base pad 415 being at least partially overlapped by the subsequent base pad 415. For example, base pad 415a, the first base pad 415 in BAN module 450a in the direction of travel, is depicted as being overlapped by base pad 415b, while 415b is shown overlapping base pad 415a and being overlapped by 415c. This continues through BAN module 450a until base pad 415f is shown overlapping base pad 415e but is not overlapped by another base pad 415 because base pad 415f is the final base pad 415 of BAN module 450a. A similar layout applies to BAN module 450b and its base pads 415g-415l. In some embodiments, the base pads 415 at the edges of adjacent BAN modules 450 may not overlap with each other and instead be installed end-to-end. In such an embodiment, as described above, base pads 415 on the ends of the BAN module 450 may overlap with only one other base pad 415. In another embodiment, the base pads 415 at the edges of adjacent BAN modules 450 may overlap with each other, such that a BAN module 450 may overlap another BAN module 450. In this embodiment, base pads 415 at the ends of the BAN module 450 may overlap with more than one other base pad 415, one from the same BAN module 450 as the edge base pad 415 and the edge base pad 415 of the adjacent BAN module 450. As shown, the respective components of the BAN modules 450 are shaded to indicate respective power paths (a detailed discussion of the BAN modules 450 is provided below in reference to FIGS. 4-6).

Shown above the schematic of the BAN modules 450a and 450b is an example of a perspective view of the layout of the base pads 415a-415l as may be viewed from above the base pads 415 looking down on the installation. As discussed above, each of the BAN modules 450 comprise six base pads 415 (415a-415f for BAN module 450a and 415g-415l for BAN module 450b). The perspective view shows another view of the overlapping base pads 415. This view more clearly indicates the overlapping pattern/nature of the subsequent base pads 415 overlapping preceding base pads 415. The embodiment shown has the BAN modules 450a and 450b adjacent such that the edge base pads 415 are end-to-end. In some embodiments, as shown here, the base pads 415 at the edges of the BAN module 450 may be of a smaller size than the base pads 415 that overlap two or more base pads 415. In another embodiment, all base pads 415 of the BAN module 450 may be of the same size. In some other embodiments, the base pads 415 of the BAN module 450 may be of differing shapes, dimensions, or sizes. As discussed above, the respective base pads 415 of the BAN module 450 may be shaded to indicate the distribution paths.

In some embodiment, as shown here in FIG. 7, the base pads 415 on either end of the BAN module 450 may be of a smaller size than the remaining base pads 415 within BAN module 450 that overlap with two other base pads 415. In some embodiments, these end base pads 415 may be half the size of the middle base pads 415 so as to provide a smooth transition between BAN modules 450. In another embodiment, the end base pads 415 may be any fractional length of the center base pads 415.

Figure 8:
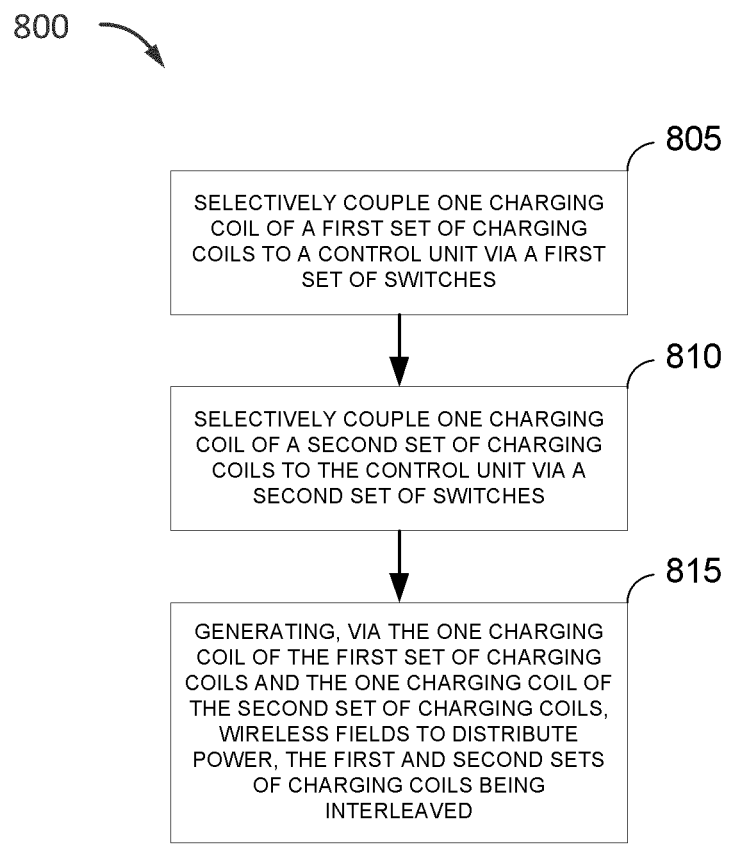
FIG. 8 illustrates a flowchart depicting one method of distributing wireless power.

FIG. 8 illustrates a flowchart depicting one method of distributing wireless power.

Block 805 of method 800 selectively couples one base pad 415 (charging pads or charging coils) of a first set of base pads 415 to a local controller 425 (control unit) via a first set of switches 420. This coupling may be performed by the respective switch 420 associated with the one base pad 415. Coupling the base pad 415 (e.g., charging pad) may comprise activating and distributing a current to the base pad 415 from the local controller 425 via the distribution circuit 421 to the switch 420 an further to the base pads 415. Alternatively, the coupling may be performed by the distribution circuit 421 comprising the wiring and circuitry between the local controller 425 and the base pad 415 and/or switch 420. In some embodiments, the switch 420 may be a component within the base pad 415 or the local controller 425 or the distribution circuit 421. Alternatively, coupling the base pad 415 may comprise preparing the base pad 415 to receive a current and generate a wireless field.

At block 810, the one base pad 415 (charging pads or charging coils) of a second set of base pads 415 to the local controller 425 (control unit) via a second set of switches. This coupling may be performed by the respective switch 420 associated with the one base pad 415. Coupling the base pad 415 (e.g., charging pad) may comprise activating and distributing a current to the base pad 415 from the local controller 425 via the distribution circuit 421 to the switch 420 an further to the base pads 415. Alternatively, the coupling may be performed by the distribution circuit 421 comprising the wiring and circuitry between the local controller 425 and the base pad 415 and/or switch 420. In some embodiments, the switch 420 may be a component within the base pad 415 or the local controller 425 or the distribution circuit 421. Alternatively, coupling the base pad 415 may comprise preparing the base pad 415 to receive a current and generate a wireless field.

Block 815 of method 800 generates, via the one base pad 415 of the first set of base pads 415 and the one base pad 415 of the second set of base pads 415, a wireless field per coupled base pad 415 to distribute power, the first and second sets of charging coils being interleaved. In some embodiments, the wireless field will be the medium through which power is distributed wirelessly.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A device for distributing power, the device comprising:
   a first plurality of charging coils configured to provide wireless power;
   a first plurality of switches, each switch of the first plurality of switches paired with one charging coil of the first plurality of charging coils and each switch configured to selectively control power to its respective charging coil;
   a second plurality of charging coils configured to provide wireless power;
   a second plurality of switches, each switch of the second plurality of switches paired with one charging coil of the second plurality of charging coils and each switch configured to selectively control power to its respective charging coil;
   a first control unit configured to control the first plurality of switches; and
   a second control unit configured to control the second plurality of switches,
   the first and second pluralities of charging coils being interleaved, the first and second control units being further configured to power only one charging coil from each of the first and second pluralities of charging coils, respectively, at a time such that adjacent charging coils are powered from different control units based on one or more control signals from each control unit, and the first plurality of switches being configured to couple the first plurality of charging coils to the control unit and the second plurality of switches being configured to couple the second plurality of charging coils to the control unit.

2. The device of claim 1, wherein the first and second control units are further configured to couple to a power source via a plurality of power paths, wherein a first power path is coupled to the first plurality of switches via the first control unit and a second power path is coupled to the second plurality of switches via the second control unit.

3. The device of claim 2, wherein the first and second control units receive current from the power source and distributes the current to the first and second pluralities of switches via the first and second power paths, respectively.

4. The device of claim 1, further comprising an inverter configured to generate a current and a backbone configured to provide the generated current to the first and second control units.

5. The device of claim 1, wherein at least one of the first and second pluralities of switches and the first and second control units is further configured to limit a phase of a current flow through a charging coil to be one of zero or 180 degrees.

6. The device of claim 1, wherein the first and second control units are further configured to receive a control signal from a system controller and activate at least one of the switches of the first or second pluralities of switches, respectively, based on the control signal.

7. The device of claim 1, wherein the first and second control units are further configured to distribute power to one charging coil via each of the first and second power paths, respectively at the same time.

8. The device of claim 1, further comprising an enclosure, wherein the first and second pluralities of charging coils, the first and second control units, and the first and second pluralities of switches are enclosed within the enclosure, and wherein the enclosure, the first and second pluralities of charging coils, the first and second control units, and the first and second pluralities of switches form a modular device.

9. A method for distributing power, the method comprising:
   selectively coupling one charging coil of a first plurality of charging coils to a first control unit via a first plurality of switches, the charging coils configured to provide wireless power;
   selectively coupling one charging coil of a second plurality of charging coils to a second control unit via a second plurality of switches;
   generating, via the one charging coil of the first plurality of charging coils a wireless field to distribute power; and
   generating, via the one charging coil of the second plurality of charging coils another wireless field to distribute power, the first and second pluralities of charging coils being interleaved and generating the wireless fields via the first and second charging coils via the first and second control units, respectively, at a same time such that adjacent charging coils are powered from different control units based on one or more control signals from each control unit.

10. The method of claim 9, further comprising:
    receiving a control signal from a system controller and selectively coupling one charging coil of the first plurality of charging coils to the first control unit based on the control signal.

11. The method of claim 9, further comprising:
    receiving a current from a power source; and
    coupling the current to the first and second pluralities of switches via a first power path and second power path, wherein the first power path couples the power source to the first plurality of switches and the second power path couples the power source to the second plurality of switches.

12. The method of claim 11, further comprising selectively distributing the current to the first and second pluralities of switches via the first and second power paths.

13. The method of claim 9, further comprising generating a current via an inverter and providing the current to the first and second control units from the inverter via a backbone.

14. The method of claim 9, further comprising limiting a phase of a current flow through the charging coils to be one of zero and 180 degrees.

15. The method of claim 9, further comprising distributing power to the first and second pluralities of switches via the first and second power paths at the same time and distributing power to a single charging coil from each of the first and second pluralities of charging coils at a moment in time.

16. The method of claim 9, further comprising enclosing, within an enclosure, the first and second pluralities of charging coils, the first and second control units, and the first and second pluralities of switches, wherein the enclosure, the first and second pluralities of charging coils, the first and second control units, and the first and second pluralities of switches form a modular device.

17. A device for distributing power, the device comprising:
    a first plurality of means for providing wireless power;
    a second plurality of means for providing wireless power;
    a first plurality of means for selectively controlling configured to selectively provide power to the first plurality of wireless power providing means;

a second plurality of means for selectively controlling configured to selectively provide power to the second plurality of wireless power providing means;
a first means for controlling the first plurality of selectively controlling means; and
a second means for controlling the second plurality of selectively controlling means, the first and second pluralities of wireless power providing means being interleaved, the first and second controlling means being configured to power only one wireless power providing means from each of the first and second pluralities of wireless power providing means, respectively, at a time such that adjacent wireless power providing means are powered from different controlling means based on one or more control signals from each controlling means, and each of the first plurality of selectively controlling means further configured to respectively couple one of the first plurality of wireless power providing means to the controlling means and each of the second plurality of selectively controlling means further configured to respectively couple one of the plurality of wireless power providing means to the controlling means.

18. The device of claim 17, wherein the first plurality of wireless power providing means comprises a first plurality of charging coils.

19. The device of claim 17, wherein the second plurality of wireless power providing means comprises a second plurality of charging coils.

20. The device of claim 17, wherein the first plurality of selectively controlling means comprises a first plurality of switches.

21. The device of claim 17, wherein the second plurality of selectively controlling means comprises a second plurality of switches.

22. The device of claim 17, wherein the first and second controlling means comprise a first control and a second control unit, respectively.

23. The device of claim 17, wherein the first controlling means is further configured to couple to a power source, via a first power path, coupled to the first plurality of selectively controlling means and wherein the second controlling means is further configured to couple the power source, via a second power path, to the second plurality of selectively controlling means.

24. The device of claim 23, wherein the first and second controlling means are further configured to receive a current from the power source and distribute the current to the first and second pluralities of selectively controlling means via the first and second power paths, respectively.

25. The device of claim 17, further comprising a means for inverting configured to generate a current and a means for conveying the current configured to provide the generated current from the means for inverting to the first and second means for controlling.

26. The device of claim 17, wherein at least one selectively controlling means of the first and second pluralities of selectively controlling means is further configured to limit a phase of a current flow through the coupled wireless power providing means to be one of zero or 180 degrees.

27. The device of claim 17, wherein the first and second controlling means are further configured to receive a control signal from a system controller and activate one of the selectively controlling means of the first or second pluralities of selectively controlling means, respectively, based on the control signal.

28. The device of claim 17, wherein the first and second controlling means are each further configured to distribute power to a single wireless power providing means via each of the first and second power paths, respectively, at a moment in time.

29. The device of claim 17, further comprising a means for enclosing, wherein the first and second pluralities of wireless providing means, the first and second controlling means, and the first and second pluralities of selectively controlling means are each enclosed within the enclosing means.

30. The device of claim 29, wherein the enclosing means, the first and second pluralities of wireless providing means, the first and second controlling means, and the first and second pluralities of selectively controlling means form a modular device.

* * * * *